(12) United States Patent
Gross

(10) Patent No.: US 6,663,465 B2
(45) Date of Patent: Dec. 16, 2003

(54) GRINDING MACHINE AND METHOD OF SHARPENING BLADES

(75) Inventor: Andreas Gross, Wuppertal (DE)

(73) Assignees: Heinz Berger Maschinenfabrik GmbH & Co., Wuppertal (DE); Karl-Robert Kuller, Solingen (DE)

(*) Notice: Subject to any disclaimer, the term of this patent is extended or adjusted under 35 U.S.C. 154(b) by 0 days.

(21) Appl. No.: 09/847,593

(22) Filed: May 2, 2001

(65) Prior Publication Data

US 2002/0025757 A1 Feb. 28, 2002

(30) Foreign Application Priority Data

May 2, 2000 (DE) .......................... 100 21 302

(51) Int. Cl.$^7$ .................. B24B 49/00; B24B 51/00; B24B 1/00
(52) U.S. Cl. ................. 451/5; 451/10; 451/45
(58) Field of Search .................. 451/5, 45, 11, 451/24, 26, 194, 198, 251, 367, 387, 405

(56) References Cited

U.S. PATENT DOCUMENTS

| | | | | |
|---|---|---|---|---|
| 4,782,633 A | * | 11/1988 | Fuller, Jr. | 451/216 |
| 4,787,176 A | * | 11/1988 | Fuller, Jr. | 451/334 |
| 4,821,463 A | * | 4/1989 | Fuller, Jr. | 414/744.1 |
| 4,837,983 A | * | 6/1989 | Fuller, Jr. | 451/216 |
| 4,869,025 A | | 9/1989 | Hill et al. | |

FOREIGN PATENT DOCUMENTS

| | | | |
|---|---|---|---|
| DE | 198 55 727 A1 | * | 6/2000 |
| FR | 2 576 819 A1 | * | 8/1986 |
| GB | 284010 | | 1/1928 |
| JP | 06039690 | | 2/1994 |
| JP | 10015803 | | 1/1998 |

* cited by examiner

Primary Examiner—M. Rachuba
(74) Attorney, Agent, or Firm—Kilpatrick Stockton LLP

(57) ABSTRACT

The invention relates to a grinding machine for sharpening (honing) blades (4) of knives, scissors, hand tools or the like, with a magazine, a feed station (1) or similar, and with a honing station (2) for the blades (4), which has two contra-rotating grinding wheels (6a, 6b). In order to automate a method to be performed using the said machine whilst maintaining a high degree of machining accuracy, it is proposed to use a robot (3) with memory-programmable control having a manipulator (5) moveable in at least four of the six possible translatory and rotational degrees of spatial freedom, a gripper head, which has a holding device for accommodating and moving a blade (4), being fixed to the manipulator (5).

15 Claims, 4 Drawing Sheets

GRINDING MACHINE AND METHOD OF SHARPENING BLADES

Figure 1:
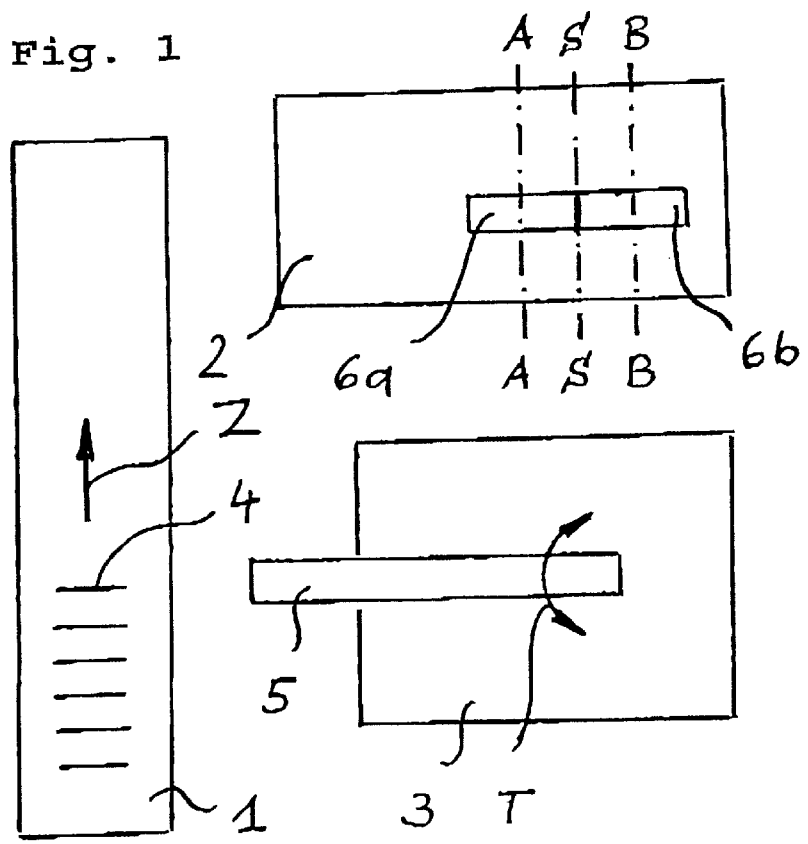

The present invention relates to a grinding machine for sharpening (honing) blades of knives, scissors, hand tools or the like, with a magazine, a feed station or similar, and with a honing station for the blades, which has two contrarotating grinding wheels. The invention furthermore relates to a method of sharpening blades that can be performed using such a machine. The said method comprises the following main operations: take-up of a blade from the magazine, the feed station or the like, feeding into the honing station, honing of the blade, depositing of the blade.

Machines of the said type have long been known, but sharpening (honing) of the blades on these is still performed manually, which entails high labour costs. This is due, among other thing s, to the large number of blades to be machined, with different cutting edge contour geometry that necessitates individual machining when applying the blade between the grinding wheels and when following the outline of the cutting edge contour during sharpening. Correct honing calls for much skill and experience on the part of the operative working on this.

The object of the present invention is to automate the honing of blades, the intention being to ensure a high dimensional accuracy for the different blade shapes, so that the carrying out of the machining process can be simplified and shortened whilst maintaining a high working accuracy of the machine.

According to the invention this is achieved by a robot with memory-programmable control having a manipulator moveable in at least four of the six possible translatory and rotational degrees of spatial freedom, a gripper head, which has a holding device for accommodating and moving a blade, being fixed to the manipulator.

The robot with memory-programmable control allows the geometric and production-engineering information, obtained from the design drawing or by measuring workpieces to be machined, to be fed into the system using a higher level programming language. From this an integral computer calculates the corresponding parts program with the various infeed and working movements for the manipulator including the gripper head.

In the method according to the invention all the aforementioned main operations, blade take-up, feeding into the honing station, honing of the blade and depositing of the blade, are therefore carried out by means of the robot with memory-programmable control using its moveable manipulator, the blades being accommodated in the holding device of the gripper head fixed to the manipulator.

At the same time, the method according to the invention proposes that the cutting edge contour preferably be approximated by radii over the length of the cutting edge, in each case between selected, succeeding support points, the radius value "infinite" being assigned to a straight contour section in the area between two adjacent support points (of a pair of support points). The invention can thus be used not only for butcher's knives, but advantageously also for sharpening blades with convex and concave contour sections, like those of certain boning knives, for example, a high degree of efficiency being achieved especially in large and medium-scale series production.

An especially advantageous embodiment of the invention resides in equipping the gripper head with a device for applying an adjustable force to a blade clamped in the holding device. In this way it is possible to replicate, in automated form, the pressure of the cutting edge of the blade against the grinding wheel that is applied in manual grinding. The application of a constant force has proved especially advantageous here, the optimum magnitude of which force may be empirically determined by prior experiment according to the cutting edge thickness and the material characteristics of the blade, especially its hardness. In contrast to manual honing, precisely defined forces can be set in this way. The honing cycle time is also advantageously no longer determined subjectively and is hence not subject to fluctuations.

The device for applying force to the blade clamped in the holding device may at the same time preferably have a piston-cylinder unit, especially a pneumatic one, with pressure regulator, for generating force. In this way the force can be applied rapidly and precisely, the use of a pneumatic device having the additional advantage that the compressed fluid has a certain cushioning action, that is to say an elastic damping effect, which benefits the machining process.

A further, extremely advantageous design feature of the grinding machine according to the invention consists of designing the holding device in such a way that the blade clamped therein can be fixed in its longitudinal and vertical height directions, but is laterally displaceable and tiltable in the direction of its thickness. This avoids the necessity of having to compile a modified control program if tolerances occur in the unmachined blanks supplied, or parts to be machined with an identical contour present slight positional differences in clamping, for example in their angular position relative to the machine table. Such a design construction of the holding device has the practical advantage that when honing, self-centring of the blade occurs due to the forces exerted by the contra-rotating grinding wheels.

Figure 2:
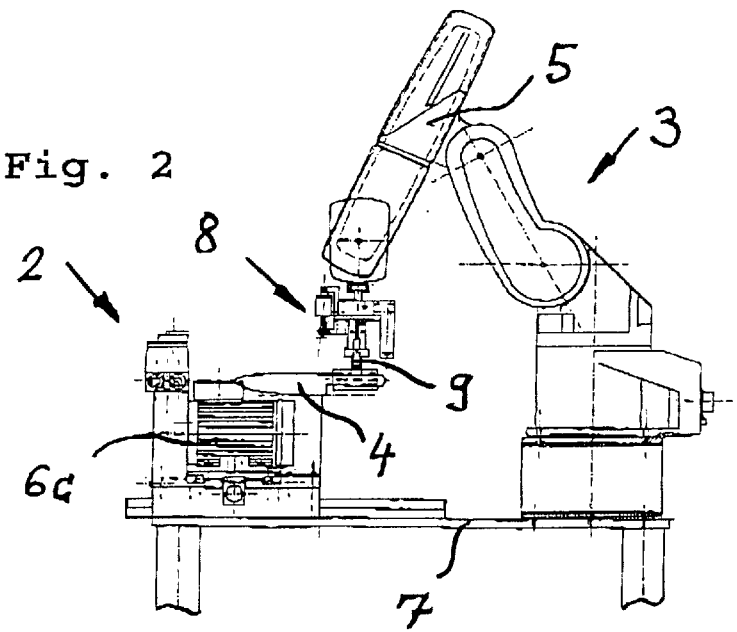
Figure 3:
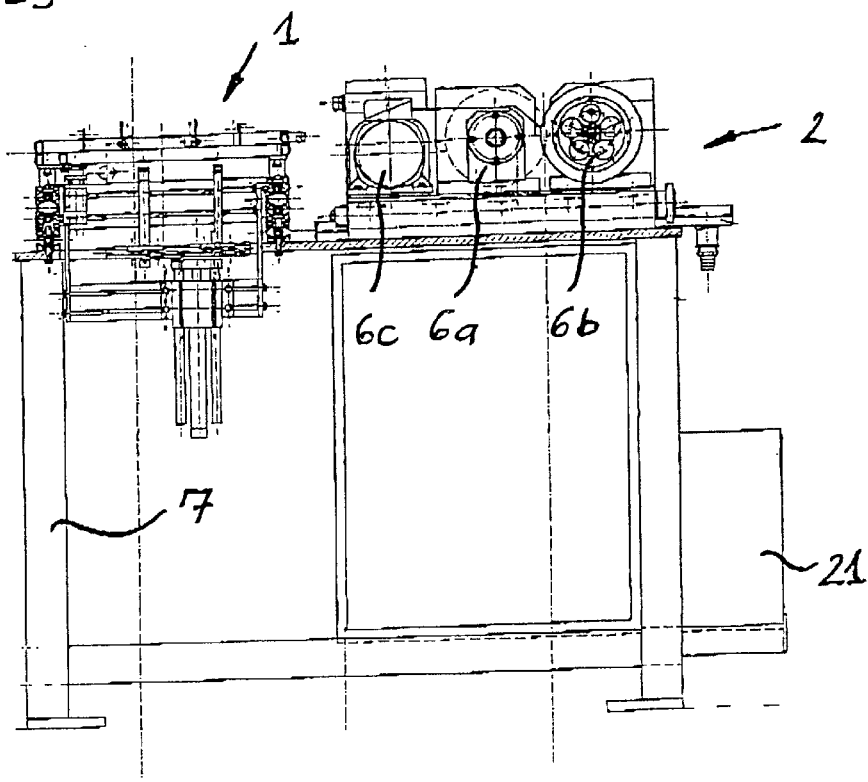
Figure 5:
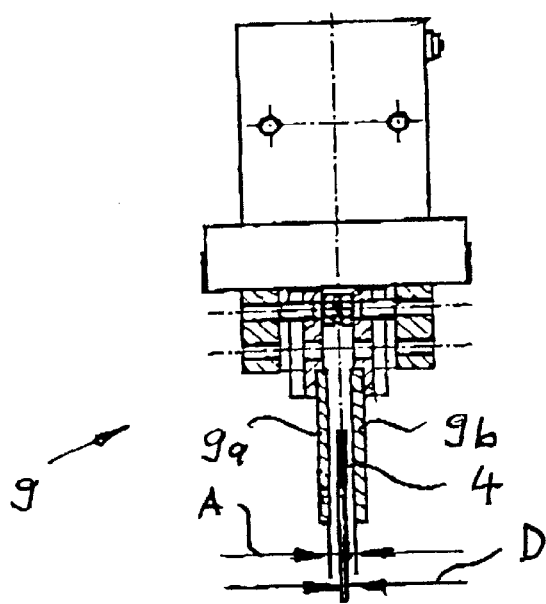
Figure 4:
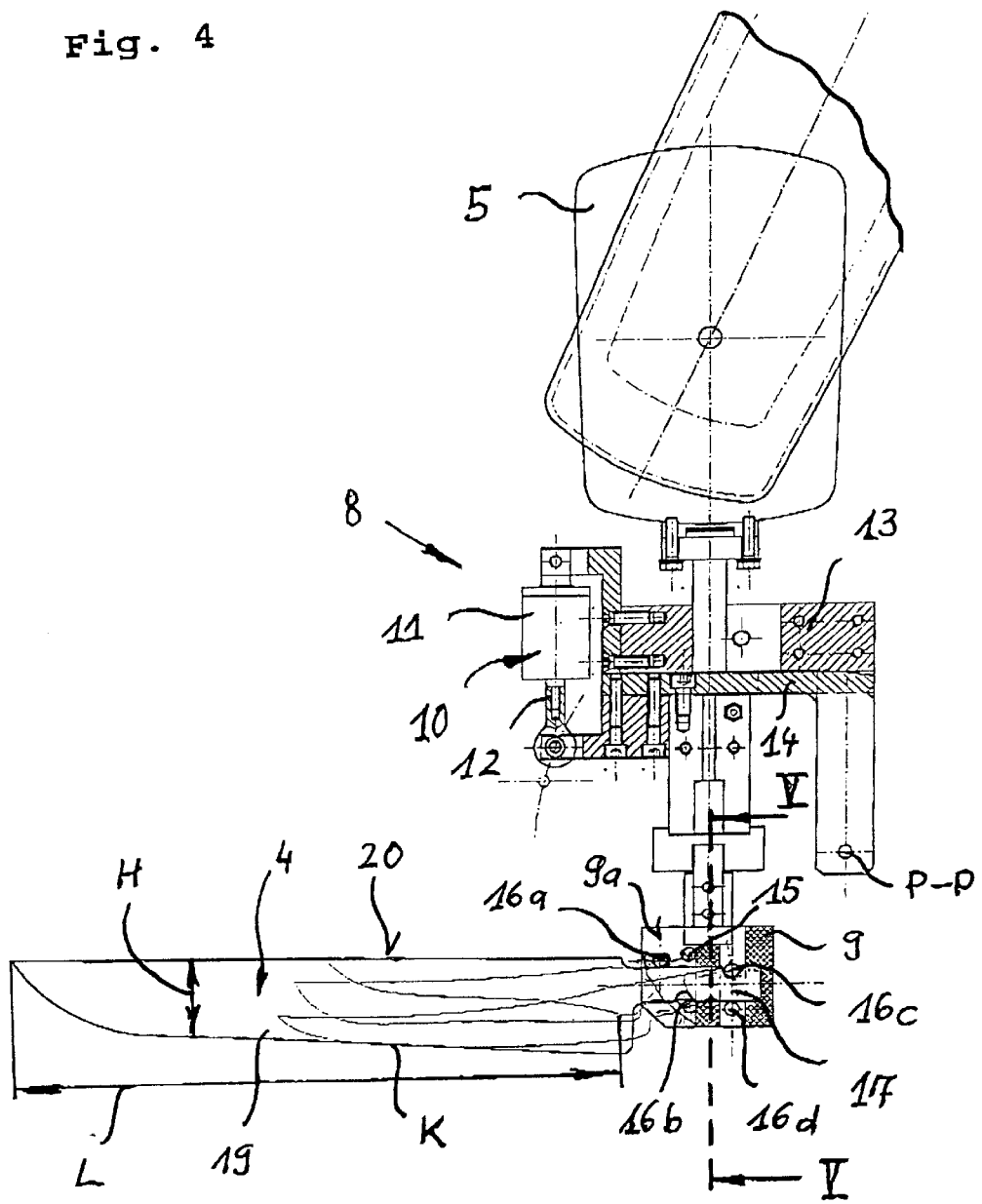
Figure 6:
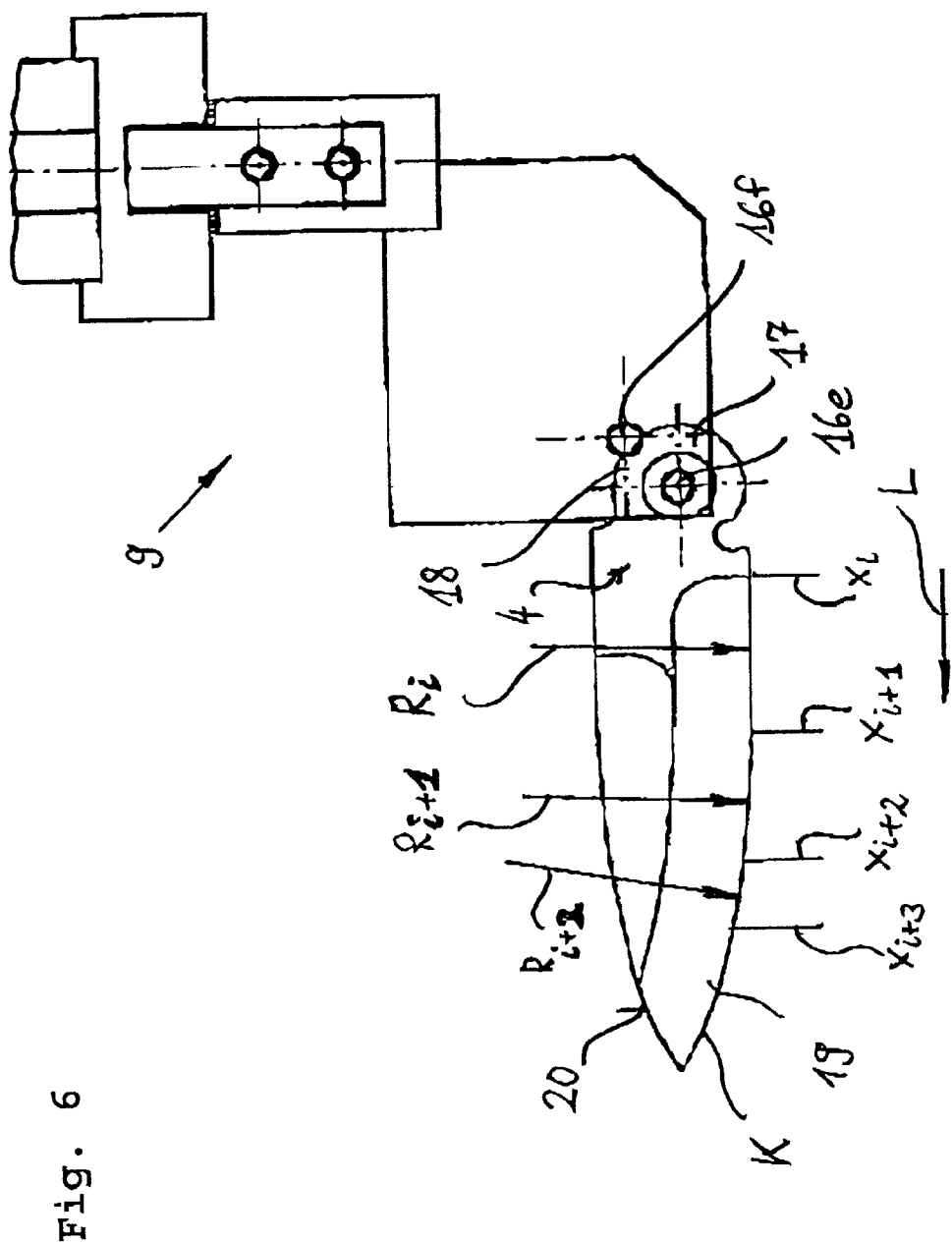

Further advantageous embodiments of the invention are contained in the subordinate claims and the following description. The invention will be explained in more detail with reference to an exemplary embodiment represented in the drawings, including a modified design of one individual component of the grinding machine according to the invention. In the drawings:

FIG. 1 shows a schematic diagram of the main constituent parts of a grinding machine according to the invention in plan view, FIG. 2 shows a side view of the robot and the honing station of the grinding machine according to the invention, FIG. 3 shows a front view of the honing station and the feed station of the grinding machine according to the invention, FIG. 4 in a representation corresponding to FIG. 2, but on a larger scale, shows a part of the robot of the grinding machine according to the invention, FIG. 5 shows a supplementary partial representation to FIG. 4 (section along the line V—V in FIG. 4), FIG. 6 shows another embodiment of the holding device viewed in the same direction as in FIG. 4.

In the various figures of the drawing identical parts are always given the same reference numbers, so that they are generally also only described once in each case.

As FIG. 1 first shows, a grinding machine according to the invention for honing blades of knives, scissors, hand tools or the like has a feed station 1, a honing station 2 and a robot 3 with memory-programmable control. The blades 4 to be sharpened are represented by dashed lines in the feed station 1 and are introduced in the direction marked by the arrow Z. The feed station 1 may be an indexing workpiece magazine, for example, the blades 4 being carried in such a way that their points point away from the robot 3.

The robot 3 has a manipulator 5 moveable in the six possible translatory and rotational degrees of spatial freedom, only the rotational movement possible about the vertical axis being indicated by the double arrow T in FIG. 1, however. By means of this movement the blades 4 taken up by the robot in the feed station 1 are swivelled to the honing station 2. In other positions of the feed station 1 relative to the honing station 2, just four degrees of freedom are sufficient for the movement of the manipulator 5.

The honing station 2 for the blades 4 has two contra-rotating grinding wheels 6a, 6b, as also represented schematically in FIG. 1. These grinding wheels 6a, 6b known in the art may be composed, for example, of cubic boron nitride, silicon carbide or of a ceramic material. In a preferred embodiment they are spiral wheels, which ensure an especially high machining accuracy.

As already mentioned, FIG. 2 shows the robot 3 and the honing station of the grinding machine according to the invention, which are mounted on a common machine table 7. It can also be seen from this figure that a gripper head 8, which has a holding device 9 for accommodating and moving the blades 4, is fixed to the manipulator 5 of the robot 3.

In FIG. 2 the two contra-rotating grinding wheels 6a, 6b are hidden by an electric drive motor 6c for the said wheels 6a, 6b, the motor, as an integral part of the honing station 2, likewise being mounted on the machine table 7 common to all main components, as can be seen from FIG. 3.

FIG. 4 shows the detailed construction of the gripper head 8 on the manipulator 5 of the robot 3. It will be apparent from this that the gripper head 8 has a device 10 for applying an adjustable force to the blade 4 clamped in the holding device 9. This device 10 for the application of force has a unit, especially a pneumatic unit, comprising a piston 11 and a cylinder 12 for generating a force. The piston-cylinder unit is pivoted on the cylinder side to an upper plate 13 of the gripper head 8 fixed to the manipulator 5 and on the piston side to a bottom plate 14, mounted so that it can swivel in relation to the upper plate 13, the holding device 9 for the blade 4 being fixed to this bottom plate 14.

As FIG. 5 shows, the holding device 9 has two side walls 9a, 9b essentially parallel with one another and capable of being joined and connected to one another with an interval between them. In addition, the holding device 9 may have means for adjustably limiting the interval B between the two side walls 9a, 9b. This may be a grub screw, for example (reference number 15 in FIG. 4). The means of limiting this interval allow the interval B between the side walls to be adjusted so that it is greater than the thickness D of the blade 4, so that the blade 4, when clamped between the side walls 9a, 9b, is laterally displaceable and capable of tilting in the direction of its thickness D. The grinding wheels 6a, 6b, as already mentioned, can thereby advantageously exert a self-centring action on the blade 4 when honing, that is to say the blade 4 is drawn through the contra-rotating grinding wheels 6a, 6b at the optimum grinding point between the wheels 6a, 6b, which improves the machining accuracy.

It must always be ensured, however, that when clamped in the holding device 9, the blade 4 can be fixed at least in its longitudinal direction L and in its vertical height direction H. This can be achieved, for example, by fixing the blade 4 in the holding device 9 by means of pins, studs or the like projecting from a side wall 9a of the holding device 9 perpendicular to the longitudinal sides of the blade, as shown in FIG. 4. FIG. 4 shows an embodiment with four pins 16a, 16b, 16c, 16d for this purpose, each of which fulfils a retaining function. In this, two of the pins 16b, 16c pass through recesses in the tang 17 of the blade 4, two pins 16a, 16d bear against the upper side and underside of this tang 17, so that it is not possible for the blade 4 either to slip out in the direction of the blade tip, or be displaced upwards or downwards or to twist or tilt in a vertical plane.

FIG. 6 shows an alternative embodiment of the holding device 9 for another blade 4. In this case only two pins 16e, 16f with a holding function are provided, of which one pin 16e passes through a hole in the blade tang 17 and the other bears against an upper projection 18 of the blade tang 17. This achieves the same effect as in the holding device 9 in FIG. 4: the holding device 9 is designed in such a way that the blade 4 clamped therein can be fixed in its longitudinal direction L and its vertical height direction H, but is laterally displaceable and tiltable in the direction of its thickness D.

The procedure in the method according to the invention is as follows:

Before performing the main operations the contour K of the cutting edge 19 of the blade 4 is approximated by radii $R_i$; $R_{i+1}$; $R_{i+1}$; etc over the longitudinal extent of the blade 4, in each case between selected, succeeding pairs of support points $X_i$, $X_{i+1}$; $X_{i+1}$, $X_{i+2}$; $X_{i+2}$, $X_{i+3}$; etc. At the same time the radius value "infinite" is assigned to a straight section of the contour K in the area between two adjacent support points (of a pair of support points) (see FIG. 6). The pairs of support points $X_i$, $X_{i+1}$; $X_{i+1}$, $X_{i+2}$; $X_{i+2}$, $X_{i+3}$; etc and the associated radius values $R_i$; $R_{i+1}$; $R_{i+2}$; etc are then fed into a computer (not shown) of the robot 3 with memory-programmable control. On the basis of these values the computer calculates the movement program for the manipulator 5 of the robot 3, including the movements of the gripper head 8 with the holding device 9, other geometric and production engineering information being taken into account, such as the blade thickness D, the blade hardness or the speed of the grinding wheels 6a, 6b.

The first main operation is taking up a blade 4 from the feed station 1. To do this the robot 3 runs the manipulator 5 into the position shown in FIG. 1. This is referred to as first "teach position" and is predetermined by the movement program of the robot 3. The two side walls 9a, 9b of the holding device 9 are run apart, so that the gripper head 9 can move the holding device 9 laterally to the workpiece, that is to the blade 4, and the respective retaining pins 16a, 16b, 16c, 16d, 16e fix the tang 17 of the blade 4 in the manner described above. The holding device 9 is then closed by moving its side walls 9a, 9b towards one another, it being possible to secure them against relative displacement, for example, by means of a positively interlocking connection. The interval B between the two side walls 9a, 9b can, as described above, be adjusted to a value greater than the thickness D of the blade 4.

By swivelling the manipulator 5 in the corresponding direction of the double arrow T according to FIG. 1, the blade 4 is then fed into the honing station 2. In so doing the blade 4 is aligned so that during the subsequent main operation of honing the blade 4 the movement of the manipulator 5 and the gripper head 8 with its holding device 9 is controlled in the six possible translatory and rotational degrees of spatial freedom in such a way that the blade 4, clamped essentially perpendicular in the holding device 9, is moved translationally and rotationally only in one perpendicular plane between the grinding wheels 6a, 6b. The said perpendicular plane passes through a line of cutting action S—S of the grinding wheels 6a, 6b running between the grinding wheels 6a, 6b parallel to their axes A—A, B—B, as can be seen from FIG. 1. The corresponding blade position predetermined by the memory programming is referred to as second teach position, the third teach position then being the unloading position.

Starting from the second teach position, the actual honing of the blade 4 occurs between the two contra-rotating grinding wheels 6a, 6b of the honing station 2. This is preferably performed in such a way that the blade 4, during the main honing operation, is moved so that a respective approximated radius $R_i$; $R_{i+1}$; $R_{i+2}$; of the contour K of the cutting edge 19 is touched tangentially by the line of cutting action S—S of the grinding wheels 6a, 6b running between the grinding wheels 6a, 6b. This ensures high working accuracy and thereby high ground surface quality.

At the same time, the blade 4 is subjected on the side of its back 20 to a force, acting towards the line of cutting action S—S of the grinding wheels 6a, 6b, by means of the device 10 for the application of force described above and shown in FIG. 4 (or another similarly acting device). This force is preferably kept constant throughout the honing process. For a thickness d of the cutting edge 19 in the range from 0.2 to 0.6 mm, it may advantageously lie, in particular, in the range of approximately 5 to 25 N, consideration needing to be given, among other things, to the selected speed of the grinding wheels 6a, 6b and the material characteristics (especially the hardness) in order to determine the force precisely.

Finally the blade 4 is deposited. For this purpose the robot 3 can again move the manipulator 5 in such a way that the blade 4 can be returned to the feed station 1. In addition it is also possible, in a position diametrically opposite that shown in FIG. 1, to remove any defective parts.

As emerges from the accounts above, the invention is not confined to the exemplary embodiment described, but rather also includes all similarly acting embodiments within the scope of the invention. This relates in particular to the design of the holding device 9 and of the gripper head 8 as a whole, it already having been mentioned that the force can also be applied to the blade 4 by different means—for example a purely mechanical solution is also applicable here.

Furthermore, the person skilled in the art will be capable of supplementing the grinding machine according to the invention through appropriate additional technical measures, or of making variations, without departing from the scope of the invention. Thus, for example a different type of magazine may also be used instead of the feed station 1 described. Even though the holding device represented, as shown in FIG. 4, is suitable for a multiplicity of blade shapes, it can nevertheless be suitably adapted through modification to certain other blade shapes, it also being possible, for example, to use plates instead of the pins 16a–16e described.

Among other things, it is also expedient when designing the gripper head 8 for precise sharpening of the cutting edge to fix the position of the hitherto unmentioned swivel axis P—P of the gripper head 8 (cf. FIG. 4), which represents the swivel axis of the bottom plate 14 in relation to the upper plate 13, at a distance from the longitudinal axis of the blade 4.

The actual honing process can preferably be performed whilst spraying the blade 4 to be machined with a coolant, for which purpose a coolant reservoir is provided in the embodiment shown.

As far as the method is concerned, the approximation of the contour K of the cutting edge 19 between the pairs of support points $X_i$, $X_{i+1}$; $X_{i+1}$, $X_{i+2}$; $X_{i+2}$, $X_{i+3}$; . . . might alternatively be performed iteratively by means of elliptical sections, exponential functions or other suitable mathematical models; for example a spline approximation might be used.

With reference to the contact of the contour K with the line of cutting action S—S of the grinding wheels 6a, 6b in the honing process it must be noted that predetermined angles of intersection other than 90° (tangential contact) are also possible, in particular angles lying within a range that deviates by, say, 20° upwards or downwards from the right angle.

Furthermore, the invention is not confined to the combination of features defined in claim 1, but may also be defined by any other combination of all individual features disclosed. This means that in principle virtually any individual feature of claim 1 may be omitted or replaced by at least one feature disclosed elsewhere in the application. To this extent claim 1 is to be interpreted solely as an initial attempt at framing an invention.

REFERENCE NUMBERS

1 Feed station
2 Honing station
3 Robot
4 Blade
5 Manipulator
6a, 6b Grinding wheels
6c Drive motor for 6a, 6b
7 Machine table
8 Gripper head on 5
9 Holding device of 8
9a, 9b Side walls of 9
10 Device for application of force
11 Piston of 10
12 Cylinder of 10
13 Upper plate of 8
14 Bottom plate of 8
15 Grub screw in 9
16a–16e Retaining pins in 9
17 Tang of 4
18 Projection on 17
19 Cutting edge of 4
20 Back of 4
21 Coolant reservoir
A—A Axis of 6a
B Interval between 9a and 9b
B—B Axis of 6b
D Thickness of 4
d Thickness of 19
H Height of 4
K Contour of 19
L Length of 4
P—P Swivel axis of 8
$R_i$ Radius of K in the range $X_i$, $X_{i+1}$
$R_{i+1}$ Radius of K in the range $X_{i+1}$, $X_{i+2}$
$R_{i+2}$ Radius of K in the range $X_{i+2}$, $X_{i+3}$
S—S Line of cutting action of 6a, 6b
T Direction of rotation of 5
$X_i$, $X_{i+1}$ Pair of support points
$X_{i+1}$, $X_{i+2}$ Pair of support points
$X_{i+2}$, $X_{i+3}$ Pair of support points
Z Direction of movement of 4 in 1

What is claimed is:

1. Method for honing blades (4) of knives and scissors, said blades (4) having a longitudinal extent (L), a thickness (D) and a height (H) and cutting edge (19) with a contour (K), the method comprising the main steps of:

taking up a blade (4) from a feed station (1), feeding the blade (4) into a honing station (2), honing the blade (4) between two contra-rotating grinding wheels (6a, 6b) of the honing station (2), and depositing the blade (4), and performing said main steps by means of a robot (3) with a memory-programmable control and with a manipulator (5) movable in at least four of the six possible translatory and rotational degrees of spatial freedom, accommodating the blade (4) in a holding device (9) of a gripper head (8), fixed to the manipulator (5)

and, before carrying out said main steps, approximating the contour (K) of the cutting edge (19) of the blade (4) between selected, succeeding pairs of support points ($X_i$, $X_{i+1}$; $X_{i+1}$, $X_{i+2}$; $X_{i+2}$, $X_{i+3}$; . . . ) over the longitudinal extent (L) of the blade (4) by a contour (K) approximation selected from the group radii ($R_i$; $R_{i+1}$; $R_{i+2}$; . . . )
elliptical sections,
exponential functions, and
spline functions feeding said pairs of support points ($X_i$, $X_{i+1}$; $X_{i+1}$, $X_{i+2}$; $X_{i+2}$, $X_{i+3}$; . . . ) and the associated approximation values into a computer operatively associated with the robot (3) with memory-programmable control; and using said computer to calculate a movement program for the manipulator (5), including the gripper head (8) with the holding device (9), to determine the position of the blade (4) during the honing operation by a line of cutting action (S—S) of the grinding wheels (6a, 6b), running between the grinding wheels (6a, 6b) parallel to their axes (A—A, B—B) and touching tangentially the contour (K) approximation of the blade (4).

2. Grinding machine for (honing) blades (4) of knives and scissors, the blades having a longitudinal extent (L), a thickness (D), and a height (H), comprising:

a magazine (1);

a honing station (2) for receiving blades (4) from the magazine, the honing station having two contra-rotating grinding wheels (6a, 6b);

a robot (3) with memory programmable control having a manipulator (5) moveable in at least four of the six possible translatory and rotational degrees of spatial freedom;

the manipulator having a gripper head (8) fixed to the manipulator and having a holding device (9) for accommodating and moving a blade (4); and said holding device (9) being operable for lateral displacement and tilting of a blade (4) clamped therein, in the direction of thickness (D) of the blade.

3. Grinding machine according to claim 2, wherein the gripper head (8) has a device (10) for applying an adjustable force to the blade (4) clamped in the holding device (9).

4. Grinding machine according to claim 3, wherein the device (10) for applying a force to the blade (4) clamped in the holding device (9) has a unit comprising a piston (11) and a cylinder (12), for generating force.

5. Grinding machine according to claim 4, wherein the device (10) for the application of force to the blade (4) clamped in the piston-cylinder unit (11, 12), is pivoted, on one of the cylinder side and piston side, to an upper plate (13) of the gripper head (8) fixed to the manipulator (5) and is pivoted, on the other of the cylinder side and piston side, to a bottom plate (14) mounted to swivel in relation to the upper plate (13), the holding device (9) for the blade (4) being fixed to the bottom plate (13).

6. Grinding machine according to claim 2, wherein the holding device (9) is operable to fix the blade (4) clamped therein at least in the longitudinal direction (L) and in the vertical height direction (H) of the blade.

7. Grinding machine according to claim 2, wherein the blade (4) is fixed in the holding device (9) by means of elements (16a, 16b, 16c, 16d, 16e, 16f) projecting from a side wall (92) of the holding device (9) perpendicular to the longitudinal sides of the blade (4).

8. Grinding machine according to claim 2, wherein the holding device (9) has two side walls (9a, 9b) substantially parallel with one another and selectively joinable and connectable to one another with an interval (B) between them.

9. Grinding machine according to claim 8, wherein the holding device (9) has means for adjustably limiting the interval (B) between the two side walls (9a, 9b).

10. Method according to claim 1, comprising, during honing the blade (4), supporting the blade on the side of its back (2) to a force acting towards the grinding wheels (6a, 6b).

11. Method according to claim 1, comprising, during honing the blade (4), subjecting the blade on the side of its back (2) to a constant force acting towards the grinding wheels (6a, 6b).

12. Method according to claim 10, wherein for a thickness (D) of the cutting edge (19) of the blade (4) in the range from 0.2 to 0.6 mm, the force acting towards the grinding wheels (6a, 6b) lies in the range of approximately 5 to 25 N.

13. Method according to claim 1, wherein in the step of approximating the contour (K) of the cutting edge (19) of the blade by radii ($R_i$; $R_{i+1}$; $R_{i+2}$; . . . ), assigning the radius value "infinite" to a straight section of the contour (K).

14. Method according to claim 13, characterized in that the computer calculates the movement program for the manipulator (5) of the robot (3), including the gripper head (8) with the holding device (9), from the values of the pairs of support points ($X_i$, $X_{i+1}$; $X_{i+1}$, $X_{i+2}$; $X_{i+2}$, $X_{i+3}$; . . . ) and the associated radius values ($R_i$; $R_{i+1}$; $R_{i+2}$; . . . ) and from information other than said values.

15. Method according to claim 1, wherein during the main steps of honing the blade (4), the movement of the manipulator (5) and of the gripper head (8) with the holding device (9) is controlled in the six possible translatory and rotational degrees of spatial freedom so that the blade (4) clamped substantially perpendicular in the holding device (9), is moved translationally and rotationally in one perpendicular plane between the grinding wheels (6a, 6b).

* * * * *

UNITED STATES PATENT AND TRADEMARK OFFICE
CERTIFICATE OF CORRECTION

PATENT NO. : 6,663,465 B2
DATED : December 16, 2003
INVENTOR(S) : Andreas Gross

It is certified that error appears in the above-identified patent and that said Letters Patent is hereby corrected as shown below:

<u>Column 8,</u>
Line 27, "(2)" should read -- (20) --.

Signed and Sealed this

Sixth Day of April, 2004

JON W. DUDAS
*Acting Director of the United States Patent and Trademark Office*